United States Patent
Park et al.

(10) Patent No.: US 8,600,603 B2
(45) Date of Patent: Dec. 3, 2013

(54) APPARATUS AND METHOD OF LOCALIZATION OF MOBILE ROBOT

(75) Inventors: Ji-young Park, Yongin-si (KR); Hyoung-ki Lee, Seongnam-si (KR); Ki-wan Choi, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 282 days.

(21) Appl. No.: 12/588,956

(22) Filed: Nov. 3, 2009

(65) Prior Publication Data

US 2010/0152945 A1     Jun. 17, 2010

(30) Foreign Application Priority Data

Dec. 17, 2008  (KR) .................. 10-2008-0128530

(51) Int. Cl.
*G01C 22/00* (2006.01)
*G05D 1/00* (2006.01)

(52) U.S. Cl.
USPC ............................................ 701/28; 701/23

(58) Field of Classification Search
None
See application file for complete search history.

(56) References Cited

U.S. PATENT DOCUMENTS

| | | | | |
|---|---|---|---|---|
| 6,957,712 B2 * | 10/2005 | Song et al. | ............... | 180/167 |
| 7,650,013 B2 * | 1/2010 | Dietsch et al. | ............... | 382/103 |
| 7,706,917 B1 * | 4/2010 | Chiappetta et al. | ............ | 700/245 |
| 2004/0167670 A1 * | 8/2004 | Goncalves et al. | ............ | 700/259 |
| 2004/0167688 A1 * | 8/2004 | Karlsson et al. | ............... | 701/23 |
| 2004/0167716 A1 * | 8/2004 | Goncalves et al. | ............ | 701/217 |
| 2004/0168148 A1 * | 8/2004 | Goncalves et al. | ............ | 717/104 |
| 2005/0182518 A1 * | 8/2005 | Karlsson | ................ | 700/253 |
| 2005/0213082 A1 * | 9/2005 | DiBernardo et al. | .... | 356/139.03 |
| 2006/0120601 A1 * | 6/2006 | Dietsch et al. | ................ | 382/173 |
| 2006/0293810 A1 | 12/2006 | Nakamoto | | |

FOREIGN PATENT DOCUMENTS

| | | |
|---|---|---|
| JP | 02-259912 | 10/1990 |
| JP | 02-259913 | 10/1990 |
| JP | 07-191755 | 7/1995 |
| JP | 2006346767 | 12/2006 |
| JP | 2007-249735 | 9/2007 |
| KR | 10-2008-0075730 | 8/2008 |

* cited by examiner

*Primary Examiner* — Ian Jen
(74) *Attorney, Agent, or Firm* — Staas & Halsey LLP

(57) ABSTRACT

A localization method and localization device of a mobile robot is provided. In one aspect, characteristic information of a reference object is stored in advance to be used as a landmark for localization, and reference characteristic information is defined by utilizing the stored characteristic information and characteristic information obtained at an initial location of the mobile robot. Therefore, the accuracy of localization can be increased without the use of additional artificial landmarks.

20 Claims, 4 Drawing Sheets

APPARATUS AND METHOD OF LOCALIZATION OF MOBILE ROBOT

CROSS-REFERENCE TO RELATED APPLICATIONS

This application claims the benefit under 35 U.S.C. §119(a) of Korean Patent Application No. 10-2008-128530, filed on Dec. 17, 2008, the disclosure of which is incorporated herein in its entirety by reference.

BACKGROUND

1. Field

One or more embodiments relate to a localization technology of acquiring contextual information, and processing the acquired information with a corresponding localization of a mobile robot.

2. Description of the Related Art

The term robot traditionally refers to an autonomous humanoid figure having mechanical components assembled therein and moving its limb and other parts imitating human movements. However, recently any autonomous apparatuses that conduct a task autonomously are referred to as robots, regardless of their figure or shape. Particularly, mobile robots are drawing attention since they can perform any kind of task in extreme environments or dangerous sites instead of humans. Also, home mobile robots such as cleaning robots have come into wide use to assist in chores while autonomously moving around the house.

When the robot autonomously moves to conduct a task, a mobile robot typically requires localization for tracking its current position. A typical example of localization technologies is a simultaneous localization and mapping (SLAM) technique. A mobile robot uses SLAM to detect information of surroundings of a work space where the robot conducts a task and process the detected information to construct a map corresponding to the work space while at the same time estimating its absolute position.

Mobile robot's acquired information on surroundings inevitably include errors, e.g., errors incurred by the corresponding sensing process. Thus, generally robot observable landmarks such as self-light emitting devices and patterns are intentionally placed on particular locations or objects to assist the mobile robot in estimating its location.

However, for a user of a home mobile robot such as a cleaning robot, such intended application of the intentional landmarks can be troublesome and problematic, considering that the mobile robot works generally in the house and such landmarks are inconvenient or difficult to implement.

SUMMARY

Accordingly, in one or more embodiments, there is provided a localization technology which can improve accuracy of localization of a mobile robot over conventional implementations without needing to implement an additional landmark.

According to an one or more embodiments, there is provided a localization device of a mobile robot including a storage unit, a registration unit, and a location estimation unit. The storage unit stores characteristic information of a reference object. The registration unit match characteristic information obtained at an initial location of the mobile robot with the stored characteristic information of the reference object stored to derive reference characteristic information, and registers the reference characteristic information. The location estimation unit estimates a location of the robot using the reference characteristic information.

The localization device may further include a relocation unit to control the mobile robot to move toward a vicinity of the reference object when the mobile robot is located incorrectly.

According to one or more embodiments, there is provided a localization method of a mobile robot including storing characteristic information of a reference object, obtaining characteristic information of surroundings at an initial location of the mobile robot, matching the obtained characteristic information of the surroundings with the stored characteristic information of the reference object to derive reference characteristic information, and registering the reference characteristic information, and estimating a location of the mobile robot using the reference characteristic information.

The localization method may further include moving the mobile robot toward a vicinity of the reference object when the mobile robot is located incorrectly.

The reference object may be a charging station for recharging the robot. The characteristic information of the reference object may be information on at least one of a shape, a color, and a corner of the reference object. The reference characteristic information may include characteristic information of a corner of the reference object and characteristic information of a plane patch of the vicinity of the corner.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
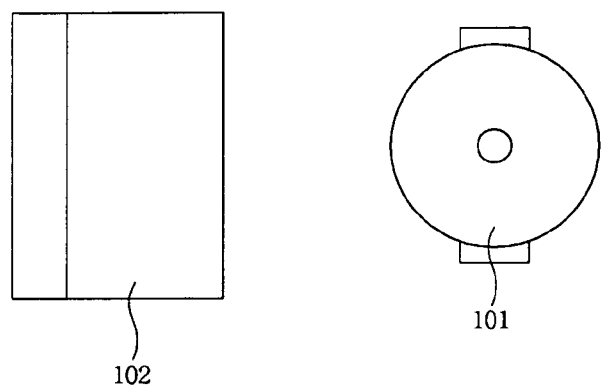
FIG. 1 is a diagram illustrating an exemplary robot system.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a diagram illustrating an exemplary robot system 100. Referring to FIG. 1, the robot system 100 includes a robot 101 and a reference object 102.

The robot 101 may be a mobile robot that moves within a predetermined area (hereinafter refer to as 'work space') to perform a particular task. The reference object 102 may be a specific object fixedly located in the work space where the robot 101 conducts a task. For example, as illustrated in FIG.

1, the robot 101 may be a cleaning robot and the reference object 102 may be a charging station for recharging the robot 101.

The robot 101 may previously store information of the reference object 102, and use the information as a landmark for its localization. Therefore, the reference object 102 is not limited to the charging station, and may be any one of objects such as a television, a refrigerator, a bed, a table, and the like which is fixedly located in the work space of the robot 101. Hereinafter, for convenience of explanation, operation of the robot 101 will be described on the assumption that the robot 101 is a cleaning robot and the reference object 102 is a charging station.

For example, the robot 101 may remain docked to the charging station 102 in normal times, leave the charging station 102 upon receiving a command for cleaning, and conduct the cleaning while moving within a predetermined space. When the power of the robot 101 drops below a predetermined level while the robot 101 is cleaning, or when the robot 101 finishes the cleaning, the robot 101 may return and dock to the charging station 102.

Such movement and task execution is performed automatically, and the robot 101 should recognize its precise location for proper performance.

For example, the robot 101 may store characteristic information of the reference object 102 in advance, and use the characteristic information of the reference object 102 as reference information when initializing localization or relocating.

Figure 2:
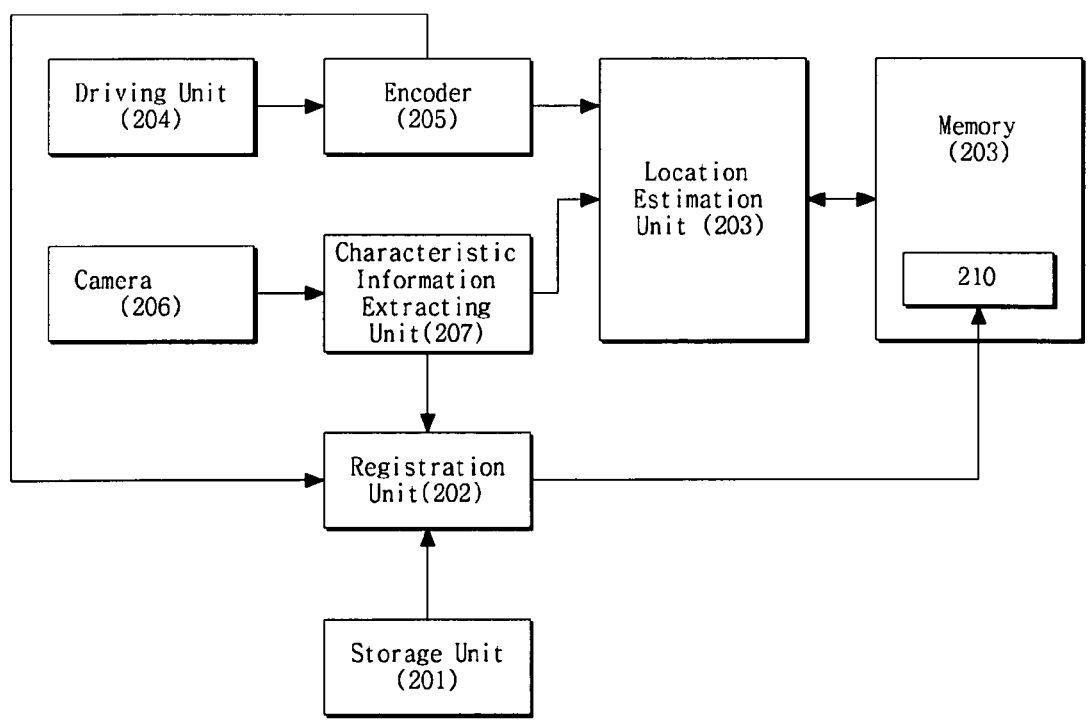
FIG. 2 is a diagram illustrating an exemplary localization device.

FIG. 2 is a diagram illustrating an exemplary localization device of the robot 101 of FIG. 1.

The localization device 200 may include a storage unit 201, a registration unit 202, and a location estimation unit 203. In addition, the localization device 200 may further include a driving unit 204, an encoder 205, a camera 206, a characteristic information extracting unit 207, and a memory 208.

The driving unit 204 supplies driving force, and may consist of wheels, a direction controller, a driving motor and the like.

The encoder 205 may receive an output signal from the driving unit 204 and measure a change of location and a change of direction between a previous location and a current location of the robot 101. In one example, the encoder 205 may detect the wheel rotation to measure a distance for which the robot 101 has travelled, and detect the current location of the robot 101 by integrating the measured distance. If there is no error in the output signal of the driving unit 204, it is possible to calculate the location of the robot 101 only by the encoder 205, but an error is inevitably incurred in outputting the signal of the driving unit 204, and thus additional information may be desired for a more accurate calculation.

The camera 206 may detect the light reflected from an object and convert the detected light into a digital signal. For example, the camera 206 may include a charge coupled device (CCD) image sensor or a complementary metal oxide semiconductor (CMOS) image sensor and a lens that transfers light to the image sensor, and enable the robot 101 to obtain surrounding images.

The characteristic information extracting unit 207 may extract characteristic information from the image obtained by the camera 206. For example, the characteristic information extracting unit 207 may use Harris corner detection scheme to detect a corner of an image and extract patch information produced by cropping an image around the corner to a predetermined size.

The location estimation unit 203 may estimate a location of the robot 101, using sensing information (e.g. an output of the encoder 205 or an output of the characteristic information extracting unit 207).

The location estimation unit 203 may use various algorithms for processing information, and typically use a simultaneous localization and mapping (SLAM) method. SLAM is a technique for the robot 101 to estimate its spatial precise location using relative position values and surroundings.

As described above, the storage unit 201 may store in advance information that the robot 101 has fully recognized. Hence, the localization device 200 is possible to calculate a more accurate robot's location using the fully recognized information in association with SLAM technology. The fully recognized information may be characteristic information of the reference object 102.

For example, the storage unit 201 may store characteristic information such as a three-dimensional image of the charging station, and coordinates of each corner of the charging station. The type of the reference object 202 may be decided according to the task of the robot 101 to conduct, and the characteristic information may be set in consideration of the robot's sensory capabilities and storage capacity.

The relation between the characteristic information of the reference object 102 and the localization method of the location estimation unit 103 will be described below in more detail.

Techniques widely used in SLAM include extended Kalman filters and particle filters. When these filters are taken as examples, the location estimation unit 103 matches characteristic information of an image obtained at the present position with characteristic information of an image obtained at a previous position. Here, matching may include a process of detecting if feature points of a new image obtained at the present position are matched with feature points of a previously obtained image. When the matching succeeds, the matched feature points are registered as reference feature points for localization. A corner of an object may be used as the reference feature point. When a robot initially observes a corner of an object, patch information in relation with the corner has a significant error in the location, and thus the corner cannot be used as the reference feature point. Hence, the same corner is observed several times at a particular position until the error regarding the feature is sufficiently reduced to the extent that the corner can be used for localization. Then, the corner is registered as a reference feature point.

In the recognition initialization process, the reference feature point may be registered only using encoder information. However, since the encoder information has enormous errors, the reliability of localization cannot be ensured if a slip occurs in the robot. If characteristic information of a previously fully identified object is registered in advance, iterative observations for convergence of an error can be omitted.

The registration unit 202 may match the characteristic information obtained at an initial location of the robot 101 with the characteristic information of the reference object stored in the storage unit 201 to register reference characteristic information 201.

The initial location of the robot 101 may be a location of the robot 101 at a moment when the robot 101 leaves the charging station to start the cleaning task, and the obtained characteristic information is initially obtained information on the charging station and surroundings. As the previously stored characteristic information is accurate information that the robot 101 has fully recognized, it can be understood that the location and map data of the robot 101 calculated by matching the previously stored characteristic information with the obtained characteristic information has few error components. Therefore, the characteristic information may be registered independently and used as reference characteristic information during performing SLAM.

In one example, when the robot leaves the charging station, the camera 206 captures surrounding image(s) including the charging station, and the characteristic information extracting unit 207 extracts characteristic information from the captured image. The registration unit 202 may detect movement of the robot 101 from the information of the encoder 205 and match the characteristic information obtained at the initial location with the previously stored characteristic information to extract the charging station's characteristic information including the background information and the current location of the robot, and register the information and location as the reference characteristic information 210 in the memory 208. The reference characteristic information 210 may be stored in the same memory 208 as the map data, or stored separately in an additional memory.

Figure 3:
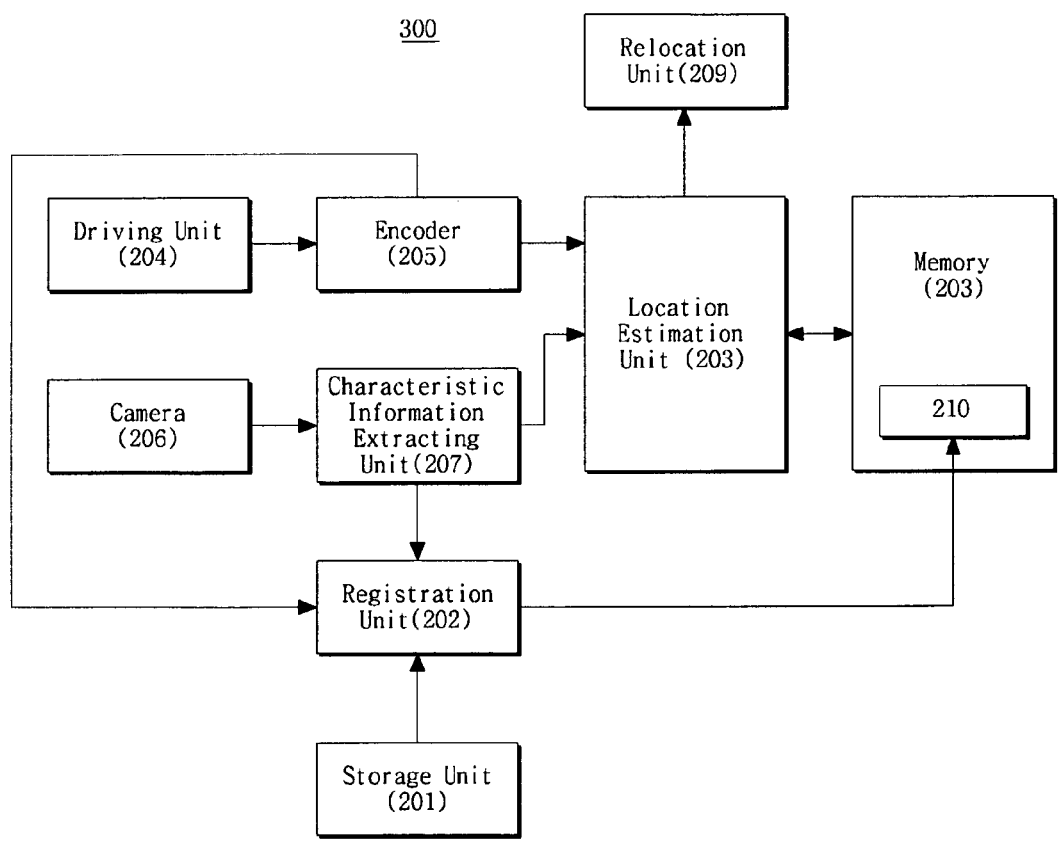
FIG. 3 is another diagram illustrating an exemplary localization device.

FIG. 3 is another diagram illustrating an exemplary localization device 300 of a mobile robot. Referring to FIG. 3, the localization device 300 includes a relocation unit 209 in addition to the above components included in the localization device 200 in FIG. 2.

The relocation unit 209 controls the mobile robot to return to the vicinity of the reference object 102 when it is determined localization is not properly conducted during the autonomous localization process while the robot is moving.

For example, if characteristic information from the image is not sufficient or slip occurs, it is determined that a location of the robot is inaccurate, and the robot is controlled to move to the vicinity of the reference object 102. Then, the reference characteristic information 210 and an image obtained at a location after moving are matched to correct the location of the robot.

Figure 4:
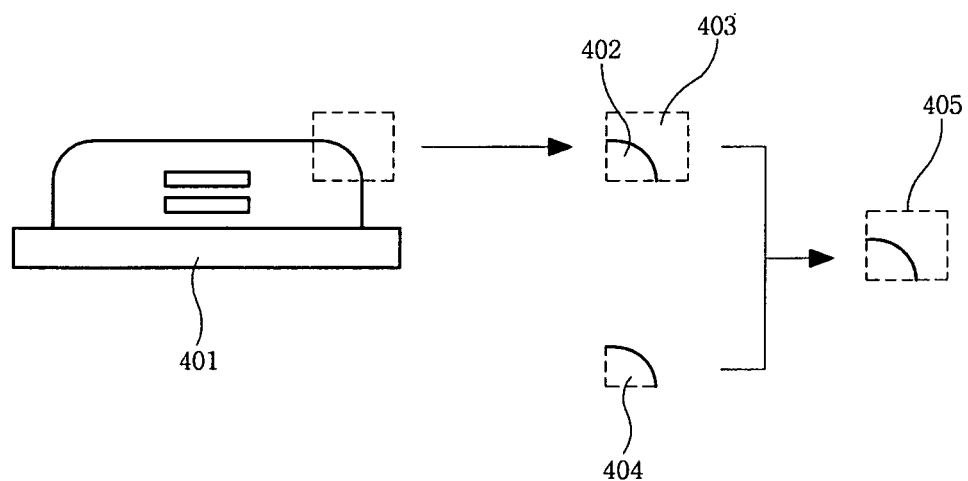
FIG. 4 is a diagram illustrating an example of reference characteristic information.

FIG. 4 is a diagram illustrating an example of reference characteristic information.

In FIG. 4, reference numeral 401 may denote a reference object such as a charging station. Reference numeral 402 may denote information of a corner of the reference object 401, reference numeral 403 may denote information of background around the corner of the object 401, and reference numeral 404 may denote characteristic information stored in the storage unit 201.

For example, the characteristic information extracting unit 207 extracts the information 402 of the corner of the charging station 401 and the information 403 of the background around the corner from the first image captured by the robot as soon as departing from the charging station 401. The extracted information may consist of pieces of patch information each having the corner of the charging station 401 as the center.

The registration unit 202 may set the initial location by matching the extracted information 402 of the corner of the charging station 401 with the previously stored characteristic information 404, and synthesize the extracted information and the previously stored characteristic information to generate the reference characteristic information 405.

The reference characteristic information 405 may be separately stored to be used as reference for SLAM operation by the location estimation unit 203.

Additionally, when the registration unit 202 stores the reference characteristic information of the charging station 401, a corner inside the charging station 401 or the color of the charging station 401 may be registered as the reference information. For example, where the robot 101 and the charging station 401 are close to each other, the corner point inside the charging station 401 may be utilized as the characteristic information for localization. The inside of the charging station 401 may refer to an inner portion other than the outline of the charging station 401.

Alternatively, where the robot 101 and the charging station 401 are placed apart from each other, characteristic information generated from additional combination of outline information (e.g., illustration 402) of the charging station 401 and background information (e.g., illustration 403) is utilized to identify the reference characteristic information of the charging station 401.

Figure 5:
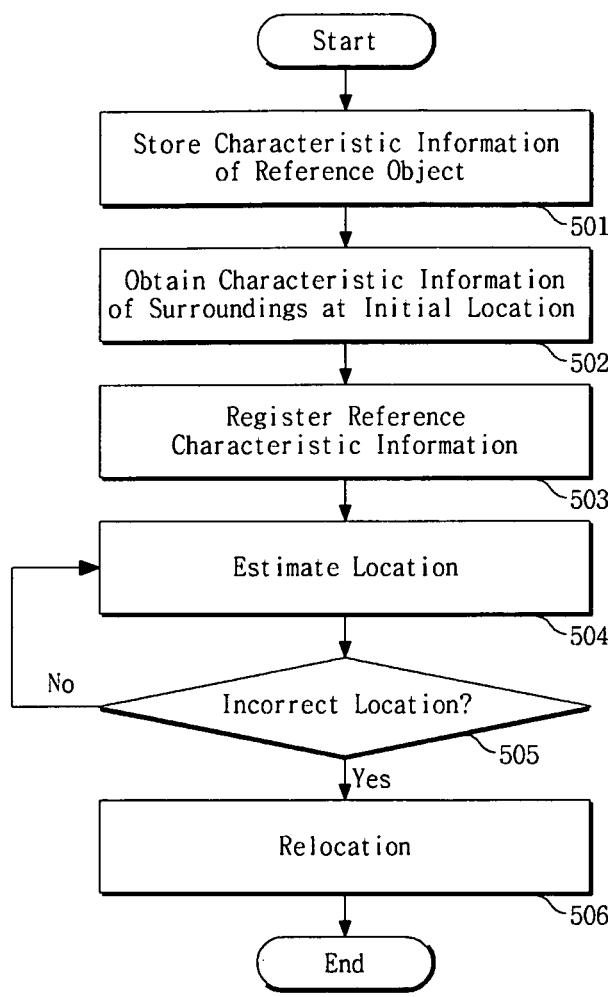
FIG. 5 is a flowchart illustrating an exemplary mobile robot's location aware method.

FIG. 5 is a flowchart illustrating an exemplary mobile robot's location aware method. Referring to FIG. 5, characteristic information of a reference object is stored in advance (operation 501), reference characteristic information of a mobile robot at an initial location is registered (operations 502 and 503), a location is estimated using the reference characteristic information while the mobile robot is conducting a task (operation 504), and relocation is performed when the robot is located incorrectly (operations 505 and 506).

In operation 501, the characteristic information of the reference object is stored in advance. The reference object may be any object fixedly located in a work space of the robot, and may be the charging station described above. The characteristic information of the reference object may include a shape, a color, and corner information of the charging station.

In operation 502, the characteristic information of the surroundings of the robot at the initial location is obtained. The initial location of the robot may be a location of the robot immediately after the departure from the charging station, and the characteristic information of the surroundings may include characteristic information on the charging station and the surroundings of the charging station at the initial location.

In operation 503, the characteristic information obtained in operation 502 and the characteristic information stored in operation 501 are matched with each other and the resulting reference characteristic information is registered. For example, as shown in FIG. 4, corner points of the charging station are matched between the obtained characteristic information and the pre-stored characteristic information, and images of the current surroundings are synthesized together to produce patch information. The patch information is registered as the reference characteristic information.

In operation 504, the location of the robot is estimated using the reference characteristic information. The algorithm used for estimation of the robot's location may be one of the algorithms used for a variety of schemes including extended Kalman filter SLAM or particle filter SLAM. For matching the characteristic information for location estimation, the reference characteristic information may be the reference characteristic information registered in operation 503. For example, an abstract distance between the robot and the charging station may be calculated by comparing the reference characteristic information and the characteristic information currently obtained.

In operation 505, it is determined whether the robot is located incorrectly. The determination may be made based on whether the number of pieces of characteristic information decreased below a predetermined number or whether slip occurs in the robot.

If the robot is located incorrectly, as in operation 506, the relocation is performed, allowing the robot to move to the vicinity of the charging station.

In addition to the above described embodiments, embodiments can also be implemented through computer readable code/instructions in/on a medium, e.g., a computer readable medium, to control at least one processing device to implement any above described embodiment. The medium can correspond to any defined, measurable, and tangible structure permitting the storing and/or transmission of the computer readable code.

The computer readable media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A localization device of a mobile robot, comprising:
a storage unit to store characteristic information of a reference object;
a characteristic information extracting unit to extract and respectively identify, from data sensed by the mobile robot at an initial location of the mobile robot, characteristic information of the reference object and characteristic information of the surroundings of the reference object;
a registration unit to match the characteristic information of the reference object and the characteristic information of the surroundings of the reference object sensed at the initial location of the mobile robot, with the stored characteristic information of the reference object, to derive, based on the matching, reference characteristic information including reference characteristic information of the reference object and reference characteristic information of the surroundings of the reference object, and to register the reference characteristic information as corresponding to the reference object, the characteristic information of the surroundings of the reference object comprising information of the background around the reference object; and
a location estimation unit to estimate a location of the robot using the reference characteristic information.

2. The localization device of claim 1, wherein the reference object is a charging station for recharging the robot.

3. The localization device of claim 1, wherein the characteristic information of the reference object is information on at least one of a shape, a color, and a corner of the reference object.

4. The localization device of claim 1, wherein the reference characteristic information includes characteristic information of a corner of the reference object and characteristic information of a plane patch in a vicinity of the corner.

5. The localization device of claim 1, wherein the location estimation unit estimates an absolute distance between the mobile robot and the reference object using the reference characteristic information.

6. The localization device of claim 1, further comprising a relocation unit to control the mobile robot to move toward a vicinity of the reference object when the mobile robot is located incorrectly.

7. A localization device of a mobile robot, comprising:
a storage unit to store characteristic information, regarding a charging station for recharging the mobile robot, before an estimating of a location of the mobile robot;
a characteristic information extracting unit to extract and respectively identify, from data sensed by the mobile robot at an initial location of the mobile robot, characteristic information of the charging station and characteristic information of the surroundings of the charging station;
a registration unit to match the characteristic information of the charging station and the characteristic information of the surroundings of the charging station, sensed at the initial location of the mobile robot after a departure from the charging station, with the characteristic information stored in the storage unit, to derive, based on the matching, reference characteristic information including reference characteristic information of the charging station and reference characteristic information of the surroundings of the charging station, and to register the reference characteristic information as corresponding to the charging station, the characteristic information of the surroundings of the reference object comprising information of the background around the reference object;
a location estimation unit to estimate the location of the mobile robot using the reference characteristic information; and
a relocation unit to control the mobile robot to move toward a vicinity of the charging station when a robot movement slip is determined to occur while the mobile robot is moving.

8. A localization method of a mobile robot, comprising:
storing characteristic information of a reference object;
extracting and respectively identifying, from data sensed by the mobile robot at an initial location of the mobile robot, characteristic information of the reference object and characteristic information of the surroundings of the reference object;
matching the characteristic information of the reference object and the characteristic information of the surroundings of the reference object sensed at the initial location of the mobile robot with the stored characteristic information of the reference object, to derive, based on the matching, reference characteristic information including reference characteristic information of the reference object and reference characteristic information of the surroundings of the reference object, and registering the reference characteristic information as corresponding to the reference object, the characteristic information of the surroundings of the reference object comprising information of the background around the reference object; and estimating a location of the mobile robot using the reference characteristic information.

9. The localization method of claim 8, wherein the reference object is a charging station for recharging the mobile robot.

10. The localization method of claim 8, wherein the characteristic information of the reference object includes information on at least one of a shape, a color, and a corner of the reference object.

11. The localization method of claim 8, wherein the reference characteristic information includes characteristic information of a corner of the reference object and characteristic information of a plane patch in a vicinity of the corner.

12. The localization method of claim 8, wherein the estimating of the location of the mobile robot comprises estimating an absolute distance between the mobile robot and the reference object using the reference characteristic information.

13. The localization method of claim 8, further comprising moving the mobile robot toward a vicinity of the reference object when the mobile robot is located incorrectly.

14. The localization device of claim 4, wherein the corner of the reference object is an outer outline corner of the reference object and the characteristic information of the plane patch in the vicinity of the corner includes characteristic information of the surroundings of the reference object.

15. The localization method of claim 11, wherein the corner of the reference object is an outer outline corner of the reference object and the characteristic information of the plane patch in the vicinity of the corner includes characteristic information of the surroundings of the reference object.

16. The localization device of claim 1, wherein the location estimation unit selectively, based upon proximity of the mobile robot to the reference object, performs one of:

estimating the location of the mobile robot based on characteristic information of the reference object included in the registered reference characteristic information without characteristic information of the surroundings of the reference object included in the registered reference characteristic information; and estimating the location of the mobile robot based on the characteristic information of the reference object included in the registered reference characteristic information and the characteristic information of the surroundings of the reference object included in the registered reference characteristic information.

17. The localization device of claim 7, wherein the location estimation unit selectively, based upon proximity of the mobile robot to the charging station, performs one of:

estimating the location of the mobile robot based on characteristic information of the charging station included in the registered reference characteristic information without characteristic information of the surroundings of the charging station included in the registered reference characteristic information; and estimating the location of the mobile robot based on the characteristic information of the charging station included in the registered reference characteristic information and the characteristic information of the surroundings of the charging station included in the registered reference characteristic information.

18. The localization method of claim 8, wherein the estimating of the location comprises selectively, based upon proximity of the mobile robot to the reference object, performing one of:

estimating the location of the mobile robot based on characteristic information of the reference object included in the registered reference characteristic information without characteristic information of the surroundings of the reference object included in the registered reference characteristic information; and estimating the location of the mobile robot based on the characteristic information of the reference object included in the registered reference characteristic information and the characteristic information of the surroundings of the reference object included in the registered reference characteristic information.

19. The localization device of claim 1, wherein a type of object selected as the reference object is determined according to a type of task the robot is directed to conduct.

20. The localization method of claim 8, wherein a type of object selected as the reference object is determined according to a type of task the robot is directed to conduct.

* * * * *